US012737112B2

(12) United States Patent
Kazi et al.

(10) Patent No.: US 12,737,112 B2
(45) Date of Patent: Sep. 15, 2026

(54) UPGRADE ORCHESTRATION OF A STORAGE SYSTEM BASED ON NAMESPACE RANGE GAPS

(71) Applicant: International Business Machines Corporation, Armonk, NY (US)

(72) Inventors: Asimuddin Kazi, Naperville, IL (US); Patrick Aaron Tamborski, Chicago, IL (US); Shikha Shree, Chicago, IL (US); Stephen Garward, Grayslake, IL (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 18/938,502

(22) Filed: Nov. 6, 2024

(65) Prior Publication Data

US 2026/0126909 A1 May 7, 2026

(51) Int. Cl.
*G06F 3/06* (2006.01)
*H04L 61/30* (2022.01)

(52) U.S. Cl.
CPC ........ *G06F 3/0607* (2013.01); *H04L 61/3005* (2013.01)

(58) Field of Classification Search
CPC ........................... G06F 3/0607; H04L 61/3005
See application file for complete search history.

(56) References Cited

U.S. PATENT DOCUMENTS 5,761,411 A 6/1998 Teague et al.
7,584,219 B2 * 9/2009 Zybura .................. G06F 16/27
7,987,167 B1 * 7/2011 Kazar ................ G06F 16/9024 707/726
8,108,483 B2 * 1/2012 Aust .................... G06F 16/188 709/217
8,151,352 B1 4/2012 Novitchi
(Continued)

OTHER PUBLICATIONS

Authors et al.: Disclosed Without Attribution, IP.com No. IPCOM000252417D, "Method and System for Classifying Memory Devices and Slices to Create Optimal Storage Decisions in Distributed Storage Network (DSN)", Jan. 9, 2018, 3 pages.
(Continued)

*Primary Examiner* — Michael Won
(74) *Attorney, Agent, or Firm* — CANTOR COLBURN LLP; Stephen Yoder

(57) ABSTRACT

Examples described herein provide a computer-implemented method that includes identifying an upgrade to be made to a storage system. The method further includes receiving, at a management device from a plurality of storage devices of the storage system, namespace information for each of the plurality of storage devices, the namespace information being shared among the plurality of storage devices. The method further includes determining, by the management device, whether a namespace gap exists based at least in part on the namespace information for each of the plurality of storage devices. The method further includes determining, by the management device, whether a namespace gap conflict exists with respect to the upgrade. The method further includes, responsive to determining that the namespace gap conflicts with the upgrade, implementing the upgrade while reducing the namespace gap conflict.

20 Claims, 16 Drawing Sheets

(56) References Cited

U.S. PATENT DOCUMENTS

| | | | | |
|---|---|---|---|---|
| 8,447,780 | B1 * | 5/2013 | Plantenberg | G06F 16/245 707/782 |
| 9,142,322 | B2 | 9/2015 | Baranwal et al. | |
| 9,171,160 | B2 | 10/2015 | Vincent et al. | |
| 9,535,774 | B2 | 1/2017 | Cher et al. | |
| 9,686,293 | B2 | 6/2017 | Golshan et al. | |
| 10,275,361 | B2 | 4/2019 | Ish et al. | |
| 10,884,648 | B2 | 1/2021 | Guo et al. | |
| 10,891,068 | B2 | 1/2021 | Guo et al. | |
| 11,226,860 | B1 * | 1/2022 | Baptist | G06F 11/1004 |
| 11,314,442 | B2 | 4/2022 | Kazi et al. | |
| 11,412,041 | B2 | 8/2022 | Tamborski et al. | |
| 11,588,892 | B1 | 2/2023 | Khadiwala et al. | |
| 11,973,823 | B1 | 4/2024 | Ghorpade et al. | |
| 2007/0006048 | A1 | 1/2007 | Zimmer et al. | |
| 2011/0145838 | A1 | 6/2011 | De et al. | |
| 2013/0326284 | A1 | 12/2013 | Losh et al. | |
| 2014/0032962 | A1 | 1/2014 | Deshpande | |
| 2015/0074469 | A1 | 3/2015 | Cher et al. | |
| 2015/0127919 | A1 | 5/2015 | Baldwin et al. | |
| 2015/0243373 | A1 | 8/2015 | Chun et al. | |
| 2016/0019983 | A1 | 1/2016 | Chung | |
| 2016/0072889 | A1 * | 3/2016 | Jung | H04L 61/457 709/219 |
| 2017/0004309 | A1 | 1/2017 | Pavlyushchik et al. | |
| 2017/0031959 | A1 | 2/2017 | Zayas et al. | |
| 2017/0090824 | A1 | 3/2017 | Tamborski | |
| 2017/0093978 | A1 | 3/2017 | Cilfone et al. | |
| 2018/0025025 | A1 | 1/2018 | Davis et al. | |
| 2018/0239697 | A1 | 8/2018 | Huang et al. | |
| 2018/0314441 | A1 | 11/2018 | Suryanarayana et al. | |
| 2019/0065524 | A1 | 2/2019 | Johnson et al. | |
| 2019/0146675 | A1 | 5/2019 | Subramanian et al. | |
| 2019/0146907 | A1 | 5/2019 | Frolikov | |
| 2019/0188589 | A1 | 6/2019 | Ponnuru et al. | |
| 2019/0278498 | A1 | 9/2019 | Dedrick | |
| 2019/0281114 | A1 | 9/2019 | Cocagne | |
| 2019/0394272 | A1 | 12/2019 | Tamborski et al. | |
| 2020/0019447 | A1 | 1/2020 | Tamborski et al. | |
| 2020/0050365 | A1 | 2/2020 | Tamborski et al. | |
| 2020/0104056 | A1 | 4/2020 | Benisty et al. | |
| 2020/0183840 | A1 * | 6/2020 | Johns | G06F 11/1048 |
| 2020/0192799 | A1 | 6/2020 | Johns et al. | |
| 2020/0278896 | A1 | 9/2020 | Kumari et al. | |
| 2020/0409559 | A1 | 12/2020 | Sharon et al. | |
| 2021/0173582 | A1 | 6/2021 | Kazi et al. | |
| 2021/0216227 | A1 | 7/2021 | Kazi et al. | |
| 2021/0349782 | A1 | 11/2021 | Ki et al. | |
| 2021/0367834 | A1 | 11/2021 | Palavalli et al. | |
| 2022/0236916 | A1 | 7/2022 | Esaka et al. | |
| 2023/0195577 | A1 | 6/2023 | Darnell et al. | |
| 2023/0401120 | A1 | 12/2023 | Gim et al. | |
| 2024/0220227 | A1 | 7/2024 | Kerr et al. | |
| 2024/0361939 | A1 | 10/2024 | Brown et al. | |
| 2024/0377948 | A1 | 11/2024 | Zhang et al. | |
| 2025/0077475 | A1 | 3/2025 | Qi et al. | |

OTHER PUBLICATIONS

Authors et al.: Disclosed Without Attribution, IP.com No. IPCOM000263306D, "Dispersed Storage Namespace Health Based Device Prioritization and Recovery Algorithm", Aug. 17, 2020, 7 pages.

Authors et al.: Disclosed Without Attribution, IP.com No. IPCOM000263385D, "Methodology of Hinting the NVME Host about the NVME Queues Optimized for NVME Namespace Operation", Aug. 26, 2020, 7 pages.

Authors et al.: Seagate Technology, LLC, IP.com No. IPCOM000268073D, "Staged NVMe in a Primary/ Secondary Relationship", Dec. 21, 2021, 4 pages.

Han et al. "ZNS+: Advanced Zoned Namespace Interface for Supporting In-Storage Zone Compaction", Proceedings of the 15th USENIX Symposium on Operating Systems Design and Implementation, Jul. 14-16, 2021, 17 pages.

Kazi, et al. "Namespace Range-Based Memory Device Compaction," U.S. Appl. No. 19/078,385, filed Mar. 13, 2025, 29 pages.

Kazi, et al. "Proactive Operating System Memory Unit Replacement Based on Namespace Health," U.S. Appl. No. 18/938,516, filed Nov. 6, 2024, 24 pages.

Min et al. "eZNS: Elastic Zoned Namespace for Enhanced Performance Isolation and Device Utilization", ACM Transactions on Storage, Jun. 6, 2024, pp. 1-41, vol. 20, Issue 3.

Tamborski, et al. "Identifying and Visualizing Namespace Range Gaps," U.S. Appl. No. 18/938,511, filed Nov. 6, 2024, 41 pages.

Tamborski, et al. "Processing Namespace Range Information by a Global Coordinator," U.S. Appl. No. 18/938,523, filed Nov. 6, 2024, 27 pages.

Wang David. "Application Optimization with Flexible Zone Namespace Configurations in QLC-Based SSDs", Silicon Motion, 2023, 16 pages.

Rahi Rohit, "Object Storage", Oct. 2019, 18 pages, https://www.oracle.com/a/ocom/docs/cloud/object-storage-100.pdf.

SNIA, "The SNIA Dictionary", Mar. 2022, 02 pages, https://www.snia.org/sites/default/files/dictionary/SNIADictionary.pdf.

United States Non-Final Rejection dated Oct. 27, 2025, 15 pages, in U.S. Appl. No. 18/938,523.

"Intel® Optane™ DC SSD Series", Intel, Feb. 2012, 27 pages, https://ark.intel.com/content/www/us/en/ark/products/series/213706/intel-optane-dc-ssd-series.html.

"Intel® Solid-State Drive 520 Series", Intel, Sep. 9, 2024, 5 pages, https://www.intel.com/content/dam/www/public/us/en/documents/product-specifications/ssd-520-specification.pdf.

"SMART Attribute Details", Kingston, 2015, 9 pages, https://media.kingston.com/support/downloads/MKP_306_SMART_attribute.pdf.

"SSD Failures: Common Causes and Main Bad Symptoms", Multi-cloud backup Solutions, Oct. 27, 2020, 9 pages, https://www.salvagedata.com/ssd-failures-common-causes-and-main-symptom/.

"Tabular Classification", Hugging Face, retrieved from web dated Dec. 20, 2024, 4 pages.

"What is supervised learning?", IBM, retrieved from web dated Dec. 20, 2024, 9 pages.

Diamantopoulos et al. "WannaLaugh: A Configurable Ransomware Emulator—Learning to Mimic Malicious Storage Traces", arXiv:2403.07540v2 [cs.CR], Jun. 12, 2024, 22 pages, https://arxiv.org/abs/2403.07540v1#.

Gagulic et al. "Ransomware Detection with Machine Learning in Storage Systems", University of Zurich Department of Informatics (IFI) Binzmühlestrasse 14, CH-8050 Zürich, Switzerland, Feb. 13, 2023, 114 pages, https://files.ifi.uzh.ch/CSG/staff/vonderassen/extern/theses/map-gagulic-zumtaugwald-sahu.pdf.

Kruegel Christopher. "Full System Emulation: Achieving Successful Automated Dynamic Analysis of Evasive Malware", Lastline, 2014, 7 pages.

Lucia Theo. "An Ultimate Guide to Hard Drive Problems, Solutions and Tips", The Wayback Machine, Jan. 13, 2021, 21 pages, https://web.archive.org/web/20210122072236/https://recoverit.wondershare.com/computer-problem/common-hard-drive-problems-and-solution.html.

Rout Sidhartha Sankar. "Reliability Aware Intelligent Memory Management (RAIMM)", Indraprastha Institute of Information Technology Delhi, New Delhi, 2014, 54 pages, https://repository.iiitd.edu.in/jspui/handle/123456789/146.

Sharma Natasha. "K-Means Clustering Explained", Neptune Blog, Apr. 15, 2024, 25 pages.

Sharma Pulkit. "An Introduction to K-Means Clustering", Machine Learning, Dec. 18, 2024, 43 pages.

Taylor et al. "Sensor-based Ransomware Detection", Future Technologies Conference (FTC), Nov. 29-30, 2017, 8 pages, https://s2.smu.edu/~mitch/ftp_dir/pubs/ftc17.pdf.

Wijaya Cornellius Yudha. "LLMs Implementation for Tabular Classifications", Trying out ML Tabular Classification Task with LLM, Nov. 16, 2023, 9 pages.

Zhang et al. "Towards Foundation Models for Learning on Tabular Data", arXiv:2310.07338 [cs.LG], Oct. 11, 2023, 22 pages.

(56) References Cited

OTHER PUBLICATIONS

United States Non-Final Rejection dated Dec. 17, 2025, 33 pages, in U.S. Appl. No. 18/938,511.
United States Non-Final Rejection dated Oct. 2, 2025, 38 p. in U.S. Appl. No. 18/938,516.
United States Notice of Allowance dated Mar. 10, 2026, 17 pages, in U.S. Appl. No. 18/938,511.
United States Notice of Allowance dated Apr. 27, 2026, 48 pages, in U.S. Appl. No. 19/078,385.

* cited by examiner

0000...
FFFF...

Pillar 7

Pillar 6

Pillar 5

Pillar 4

Pillar 3

Pillar 2

Pillar 1

Pillar 0

Stripe 1

FIG. 5A

Pillar 0
Pillar 1
Pillar 2
Pillar 3
Pillar 4
0000...
5555...
Pillar 5
Pillar 6
Pillar 7
Stripe 2
5555...
AAAA...
Stripe 3
AAAA...
FFFF...

FIG. 9

UPGRADE ORCHESTRATION OF A STORAGE SYSTEM BASED ON NAMESPACE RANGE GAPS

BACKGROUND

The present disclosure relates to computing environments, and more specifically, to upgrade orchestration of a storage system based on namespace range gaps.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computing device may effectively extend its CPU by using "cloud computing" to perform one or more computing functions (e.g., a service, an application, an algorithm, an arithmetic logic function, etc.) on behalf of the computing device. Further, for large services, applications, and/or functions, cloud computing may be performed by multiple cloud computing resources in a distributed manner to improve the response time for completion of the service, application, and/or function. For example, Hadoop is an open-source software framework that supports distributed applications, enabling application execution by hundreds or thousands of computers.

In addition to cloud computing, a computing device may use "cloud storage" as part of its memory system. Cloud storage enables a user, via its computing device, to store files, applications, etc., on an Internet-based storage system. The Internet-based storage system may include a RAID (redundant array of independent disks) system and/or a dispersed storage system that uses an error correction scheme to encode data for storage.

SUMMARY

According to an embodiment, a computer-implemented method for upgrade orchestration of a storage system based on namespace range gaps is provided. The method includes identifying an upgrade to be made to a storage system. The method further includes receiving, at a management device from a plurality of storage devices of the storage system, namespace information for each of the plurality of storage devices, the namespace information being shared among the plurality of storage devices. The method further includes determining, by the management device, whether a namespace gap exists based at least in part on the namespace information for each of the plurality of storage devices. The method further includes determining, by the management device, whether a namespace gap conflict exists with respect to the upgrade. The method further includes, responsive to determining that the namespace gap conflicts with the upgrade, implementing the upgrade while reducing the namespace gap conflict.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

FIGS. 5A and 5B schematically illustrate an example of orchestrating an upgrade of a storage system based on namespace range gaps, according to an embodiment;

FIG. 9 schematically illustrates an example of orchestrating an upgrade of a storage system based on namespace range gaps, according to an embodiment.

DETAILED DESCRIPTION

Figure 1:
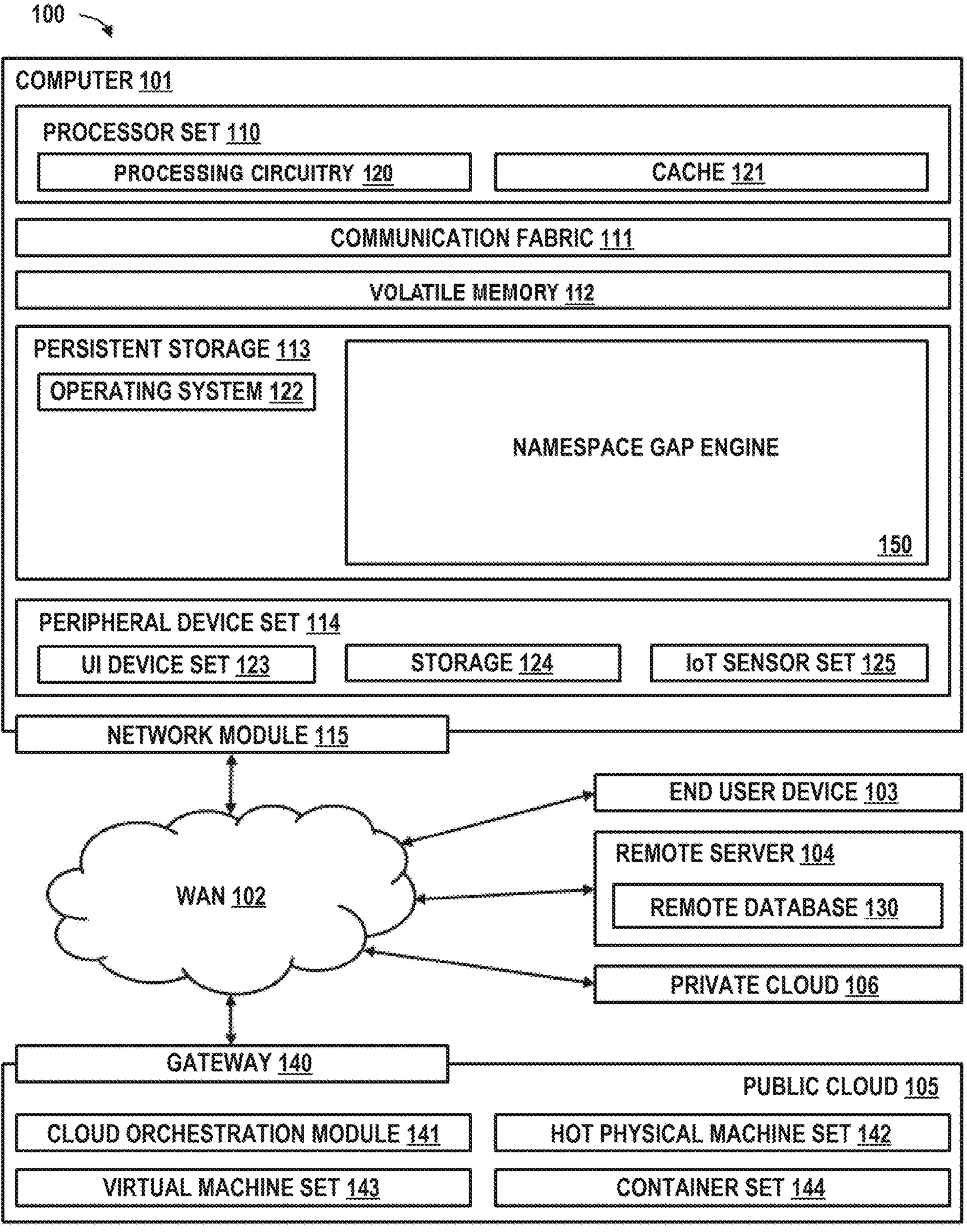
FIG. 1 illustrates a block diagram of a computing environment, according to an embodiment.

One or more embodiments described herein provide for upgrade orchestration of a storage system based on namespace range gaps.

Storage systems refer to the various methods and technologies used to save, manage, and retrieve data. They encompass a range of solutions, from traditional hard disk drives (HDDs) and solid-state drives (SSDs) to advanced cloud-based and network-attached storage (NAS) systems. These systems are useful for both individuals and organizations to securely store and access data efficiently. Storage systems can be classified into primary storage, which includes high-speed devices for quick access, and secondary storage, which provides larger capacity and longer-term data retention. Advanced storage solutions also utilize technologies like RAID configurations, distributed storage, and object storage, which enhance data redundancy, reliability, and scalability. Modern systems often integrate with cloud infrastructure, providing versatile options for backup, disaster recovery, and data synchronization across multiple locations.

In a storage system, a namespace provides a structured way to organize and manage data by assigning a unique identifier to each data element or object. This allows for easy retrieval and categorization, similar to how file paths work in a filesystem. A namespace ensures that data within the system can be accessed without ambiguity, as each item has a distinct identifier. In distributed and cloud storage systems, namespaces are useful for managing data across multiple storage nodes and locations, enabling seamless scaling and access control. By abstracting data storage from physical devices, namespaces also facilitate features, such as data deduplication, versioning, and metadata management, making it easier to implement policies for data lifecycle, security, and compliance.

Gaps in namespaces can occur when data is assigned a name and the underlying storage mechanism responsible for the name is unreadable or unavailable.

In some cases, it may be desirable to upgrade a storage system, such as to replace a failed or failing drive of the storage system. However, in some cases, an upgrade to a storage system can cause operability problems of the storage system when namespace gaps are present. One or more embodiments described herein addresses this and other shortcomings by providing upgrade orchestration based of namespace range gaps to prevent reads/writes availability outages.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a namespace gap engine 150 for generating parameters for statistical timing analysis of a circuit. In addition to the namespace gap engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the namespace gap engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the namespace gap engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the namespace gap engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
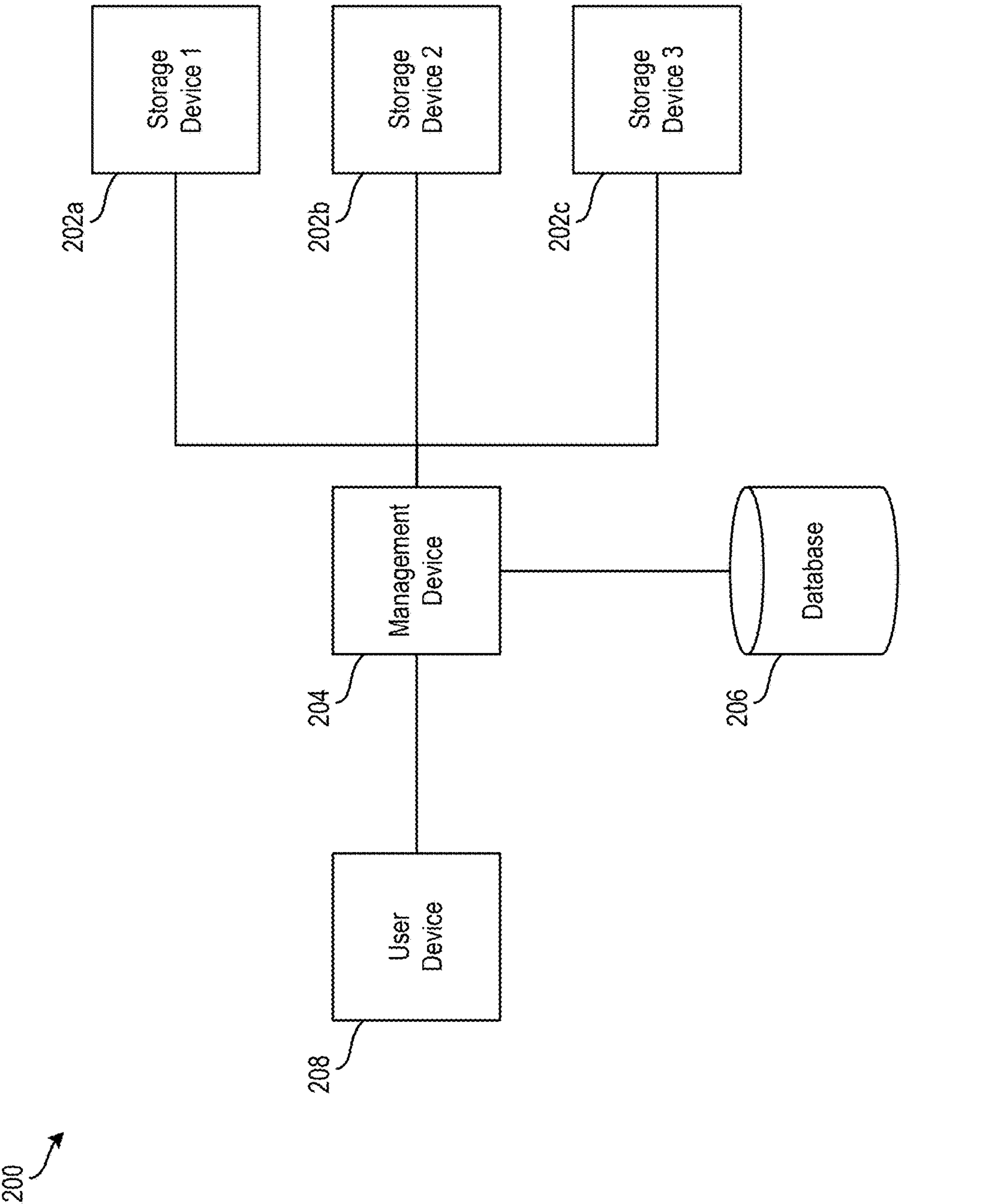
FIG. 2 schematically illustrates a block diagram of a storage system, according to an embodiment.

FIG. 2 illustrates a block diagram of a storage system 200 for identifying namespace range gaps, according to an embodiment. The storage system 200 is an example of a data storage network (DSN). The storage system 200 can be implemented by any suitable computing system, device, or environment, such as those described herein.

The storage system 200 includes multiple storage devices, including storage device 1 202*a*, storage device 2 202*b*, and storage device 3 202*c* (collectively referred to as "storage devices 202" and also referred to as "storage units"). Although three storage devices are shown, other numbers (e.g., fewer or greater) of storage devices can be implemented in other embodiments. The storage devices 202 are communicatively connected to a management device 204 for managing aspects of the storage devices 202. The management device 204 is also communicatively connected to a database 206, which stores information about the storage devices 202, such as information about namespace range gaps, as well as other suitable information. The management device 204 can notify a user via user device 208 of any namespace range gaps and/or other suitable information. The user device 208 can be any suitable system or device, such as a laptop computer, desktop computer, virtual computer environment, smartphone, tablet computer, wearable computing device, and/or the like, including combinations and/or multiples thereof.

With continued reference to FIG. 2, the management device 204 oversees distributed data storage by setting parameters for the storage devices 202. Such parameters can be used for vault creation, storage, security, etc. The management device 204 coordinates the creation of a vault (e.g., a virtual memory block associated with a portion of an overall namespace of the storage devices 202) within the memory of the storage devices 202. The management device 204 generates a slice name (SN) for each of the encoded data slices of the storage devices 202. The slice name includes pillar number of the encoded data slice, a data segment number, a vault identifier, which serves as a DSN address for storage and retrieval, and/or the like, including combinations and/or multiples thereof.

Data storage units (e.g., the storage devices 202) are assigned memory devices to store and retrieve slices, aiming to balance storage availability. The management device 204 assigns DSN address ranges to storage units (e.g., the storage devices 202) and generates resource assignment information, including dispersal parameters, storage unit identifiers, addressing details, and/or the like, including combinations and/or multiples thereof. This information is distributed to the storage devices 202 to initialize their use for storing encoded data slices. To recover data segments, a decode threshold number of encoded data slices is required to recover the data segment, and a write threshold number of encoded data slices is needed for a successful write operation recovery. Each of the storage devices 202, with its processor and memory, provides resource availability information to the management device 204, receives resource assignment information, and selects memory devices for the new DSN memory based on this information.

According to one or more embodiments, the storage system 200 provides for orchestrating upgrades to storage system 200 while taking into account potential namespace range gaps in the storage namespace, ensuring maximum durability of data and low risk upgrades. More particularly, one or more embodiments provides upgrade orchestration based on gaps in namespace ranges to prevent reads/writes availability outages by including a gap in a portion of the namespace range on a per stripe, set, storage pool, or vault as another criterion to orchestrate upgrades. One or more embodiments support upgrades where the storage system 200 continues to upgrade without causing reads/writes availability outages with the knowledge of gaps in the namespace range, which in some cases without this method, prevented upgrades to proceed. One or more embodiments warns a user associated with a user device 208 when an upgrade of a memory device may result in an availability outage. In such cases, further upgrades are prevented if an upgrade results in unavailability of the storage system 200. In distributed storage systems, such as the storage system 200, if health of the storage system is calculated by the overall health of a memory device, then this may result in reporting false positive or negative system's health. The false positive health triggered by namespace range gaps could trigger storage system outage during upgrades.

In particularly, one or more embodiments described herein provide for warning a user or taking a corrective action when an upgrade of a memory device may result in an availability outage of the storage system 200 due to a namespace range gap. A namespace range can include exemplars to identify requests, such as defining metric exemplars for traces. A namespace range gap affects the health of storage units, and a shrinking gap metric can be linked to rebuilder. One or more embodiments described herein not only helps identify namespace gaps but also provides a clearer understanding of how specific namespaces are affected by bad drives and how namespace gaps can conflict with upgrades. The management device 204 can take actions, such as informing operators, creating alerts about speed, order, remediation, action plans, and execution plans based on namespace information, such as when an upgrade is to be implemented.

Aggregating gaps in memory for reporting significantly reduces the time required for manually managing the namespace, increase the efficiency of identifying namespace range gaps, and ensures timely, proactive measures to maintain the stability and reliability of the storage system during upgrades.

With continued reference to FIG. 2, the management device 204 exposes a new metric that publishes the actual NSR gaps identified across disks on one or more of the storage devices 202. According to one or more embodiments, one or more of the storage devices 202 can publish the active namespace ranges, which allows another of the storage devices 202 derive the inverse and calculate the NSR gaps. The management device 204 organizes the NSR gap information from each of the storage devices 202 and persists this information in a file (e.g., in the database 206), with fields, such as drive identifier, vault identifier, pillar index, storage type, minimum range, maximum range, and/or the like, including combinations and/or multiples thereof.

The information stored in the database 206 can be aggregated in memory to generate alerts or incidents for the user associated with the user device 208. According to one or more embodiments, incidents are generated on a per-stripe basis whenever a NSR gap is identified in a portion of the namespace, with each incident indicating the worst hole in a stripe across all storage types. Alerts can be decomposed into multiple levels, such as per vault, per storage type, and per stripe, from highest to lowest level. Alerting can also be customized based on logical units, and an advanced configuration mechanism will allow alerts to be turned off if necessary.

Additionally, the information stored in the database 206 can impact the health of one or more of the storage devices 202. The shrinking gaps can be associated with rebuilder agents, functions, etc. The information stored in the database 206 can also be used such that the system can also track the age of a hole in a storage unit. Different managing units can act by informing users through alerts, which include details about speed, order, corrective actions, execution plans, and/or the like, including combinations and/or multiples thereof. This comprehensive approach ensures that namespace gap data is effectively utilized to derive actionable results, generate alerts, and manage the health and performance of storage units.

According to one or more embodiments, the management device 204 also provides for warning if the storage system 200 is approaching unavailability. According to one or more embodiments, the management device 204 pauses further upgrades if an initial upgrade results in unavailability of the storage system 200. These approaches enhance the upgrade orchestration of the storage system 200 that considers the overall health of the memory devices of the storage devices 202 by including namespace range on a per stripe, set, storage pool, or vault as a criterion to orchestrate upgrades. In distributed storage systems that do not consider namespace range gaps, if health of the storage system is calculated based on the overall health of a memory device, then a false positive or negative system health may be reported. The false positive health triggered by namespace range gaps could trigger storage system outage during upgrades. To address this concern, the management device 204 identifies namespace range gaps and uses the namespace range gap information to mitigate the risk of availability outage (e.g., unavailability) of the storage system 200 during upgrades. Scenarios/examples are described in more detail with reference to FIGS. 4-10B that illustrate how this approach improves availability of the storage system 200 during upgrades by using knowledge of the namespace range gaps.

Figure 3:
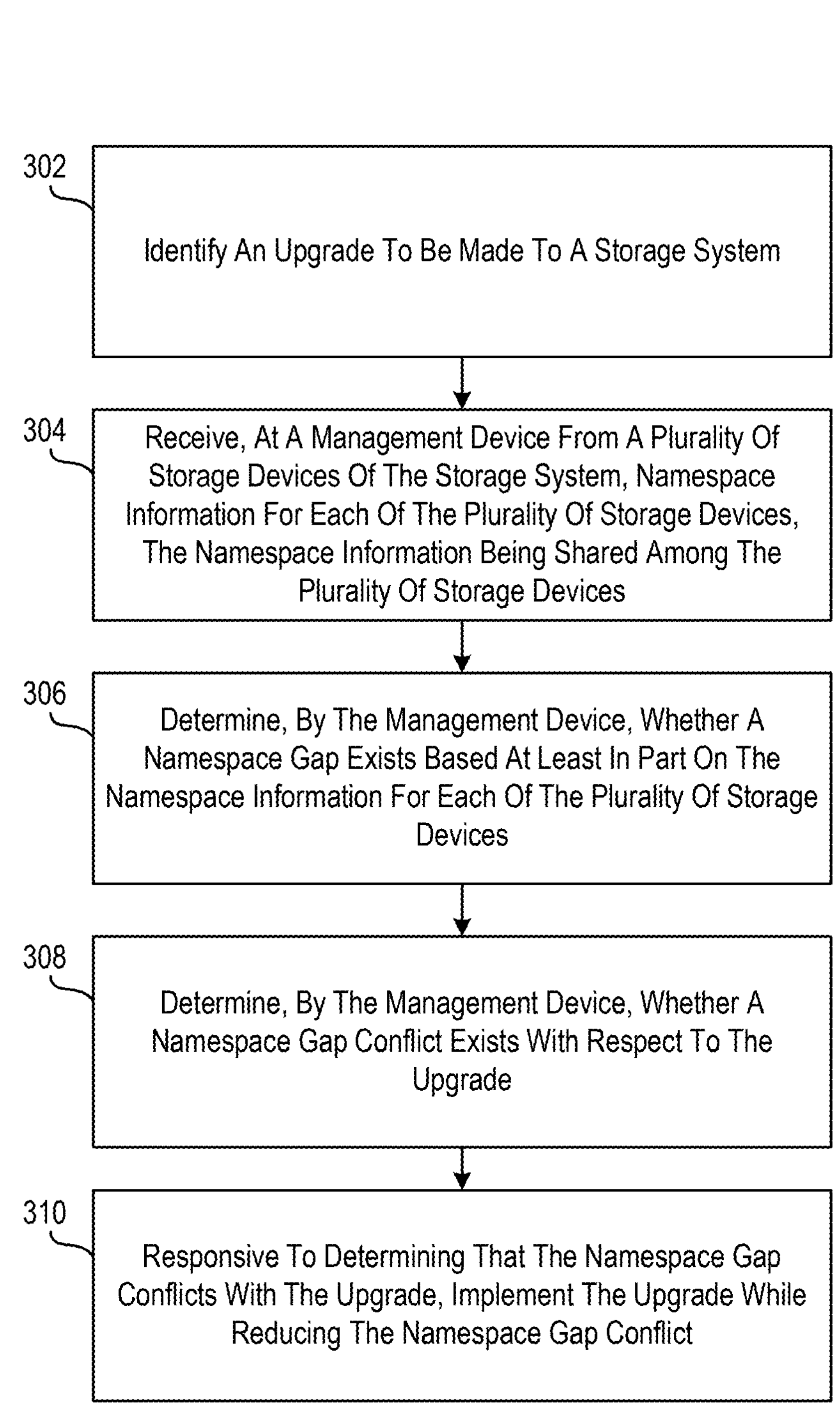
FIG. 3 illustrates a flow diagram of a method for orchestrating an upgrade of a storage system based on namespace range gaps, according to an embodiment.

Turning now to FIG. 3, a flow diagram of a method 300 for orchestrating an upgrade of a storage system based on namespace range gaps is provided, according to an embodiment. The method 300 can be performed by any suitable computing system, device, or environment, such as those described herein. The method 300 is now described with reference to the computing environment 100, and particularly the namespace gap engine 150, but is not so limited.

The method 300 begins at block 302, where the management device 204 (e.g., the namespace gap engine 150) identifies an upgrade to be made to a storage system (e.g., the storage system 200). This involves determining the specific components or aspects of the storage system that are to be enhanced and/or replaced via upgrade.

At block 304, the management device 204 (e.g., the namespace gap engine 150) receives, from a plurality of storage devices (e.g., the storage devices 202), namespace information for the storage devices of the storage system. The namespace information is shared among the plurality of storage devices. For example, the storage device 202*a* shares its namespace information with the storage devices 202*b* and 202*c*. The management device 204, which may include the namespace gap engine 150, plays a role in gathering and processing this information. The management device 204 ensures that the namespace information is accurately collected and distributed among the storage devices, facilitating the identification of namespace gaps.

At block 306, the management device 204 (e.g., the namespace gap engine 150) determines whether a namespace gap exists based at least in part on the namespace information for each of the plurality of storage devices. This determination involves analyzing the namespace data to identify any discontinuities or gaps that may affect the performance of the storage system 200. The management device 204 utilizes algorithms and processing capabilities to assess the namespace information, ensuring that any potential gaps are detected promptly. According to one or more embodiments, determining whether the namespace gap exists includes looping over each stripe of the plurality of storage devices to identify a gap that results in a vault operating in one of read only, alert, or write only mode.

At block 308, the management device 204 (e.g., the namespace gap engine 150) determines whether a namespace gap conflict exists with respect to the upgrade. This involves assessing whether the identified namespace gaps could interfere with the planned upgrade process. Conflicts are further described herein with reference to FIGS. 4A-10B. A conflict may be considered to exist, for example, where a conflict would result in unavailability of at least a portion of the storage system 200.

At block 310, responsive to determining that the namespace gap conflicts with the upgrade, the management device 204 (e.g., the namespace gap engine 150) implements the upgrade while reducing the namespace gap conflict. This step ensures that the upgrade proceeds smoothly without exacerbating any existing namespace issues.

Implementing an update while reducing namespace gap conflicts improves the functionality of the storage system 200 in one or more ways, such as the following non-limiting examples:

Streamlined Upgrade Process: By mitigating namespace gap conflicts, the upgrade process becomes more streamlined and less prone to interruptions. This ensures that upgrades can be completed more quickly and with fewer complications.

Enhanced Data Availability: By addressing namespace gaps, the system ensures that data remains accessible during upgrades. This prevents read/write availability outages, maintaining continuous data access for users.

Improved System Reliability: Reducing conflicts minimizes the risk of system failures or performance degradation during upgrades. This enhances the overall reliability of the storage system, ensuring it operates smoothly even during maintenance activities.

Optimized Resource Utilization: Efficiently managing namespace gaps allows for better resource allocation and utilization. This leads to improved storage efficiency and performance, as data is more evenly distributed across available storage units.

Proactive Problem Resolution: Identifying and addressing namespace gaps before they cause issues allows for proactive problem-solving. This reduces the likelihood of unexpected downtime or data loss, enhancing the system's robustness.

Overall, these improvements contribute to a more stable, efficient, and reliable storage system, capable of handling upgrades without compromising data availability or system performance.

Additional processes also may be included, and it should be understood that the processes depicted in FIG. 3 represent illustrations, and that other processes may be added or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

As described, one or more embodiments provides for orchestrating an upgrade of a storage system based on namespace range gaps. Examples and various other scenarios of upgrades can be configured based on namespace range gaps for writes only or for both reads and writes availability. In these examples, the following assumptions may be made, but merely to illustrate features of the embodiments described herein; such assumptions should not be considered limiting. If five or more drives are not available on a memory device, then the memory device is considered in error state. Each of the memory devices have 48 drives (although other numbers of drives may be used in other embodiments). Each of the drives have substantially the same capacity. The namespace range is substantially uniformly distributed on each drive.

If 8-wide information dispersal algorithm (IDA) across 8 memory devices (Single Stripe System) is used, where the number of memory devices is equal to IDA width, each memory device is responsible for exactly one pillar of slices, and the set contains exactly one stripe. This configuration is shown in FIG. 4.

Figure 4:
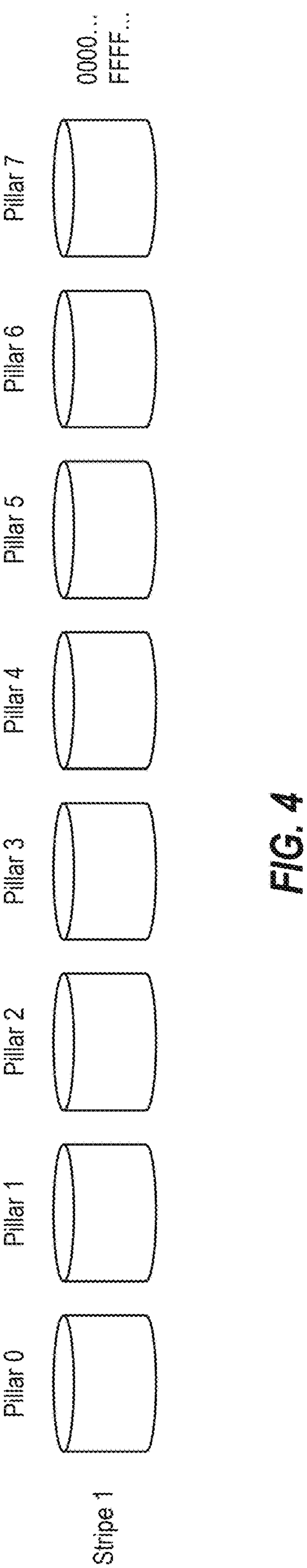
FIG. 4 schematically illustrate an example of a stripe of one of the storage devices of the storage system of FIG. 2, according to an embodiment.
Figure 5A:
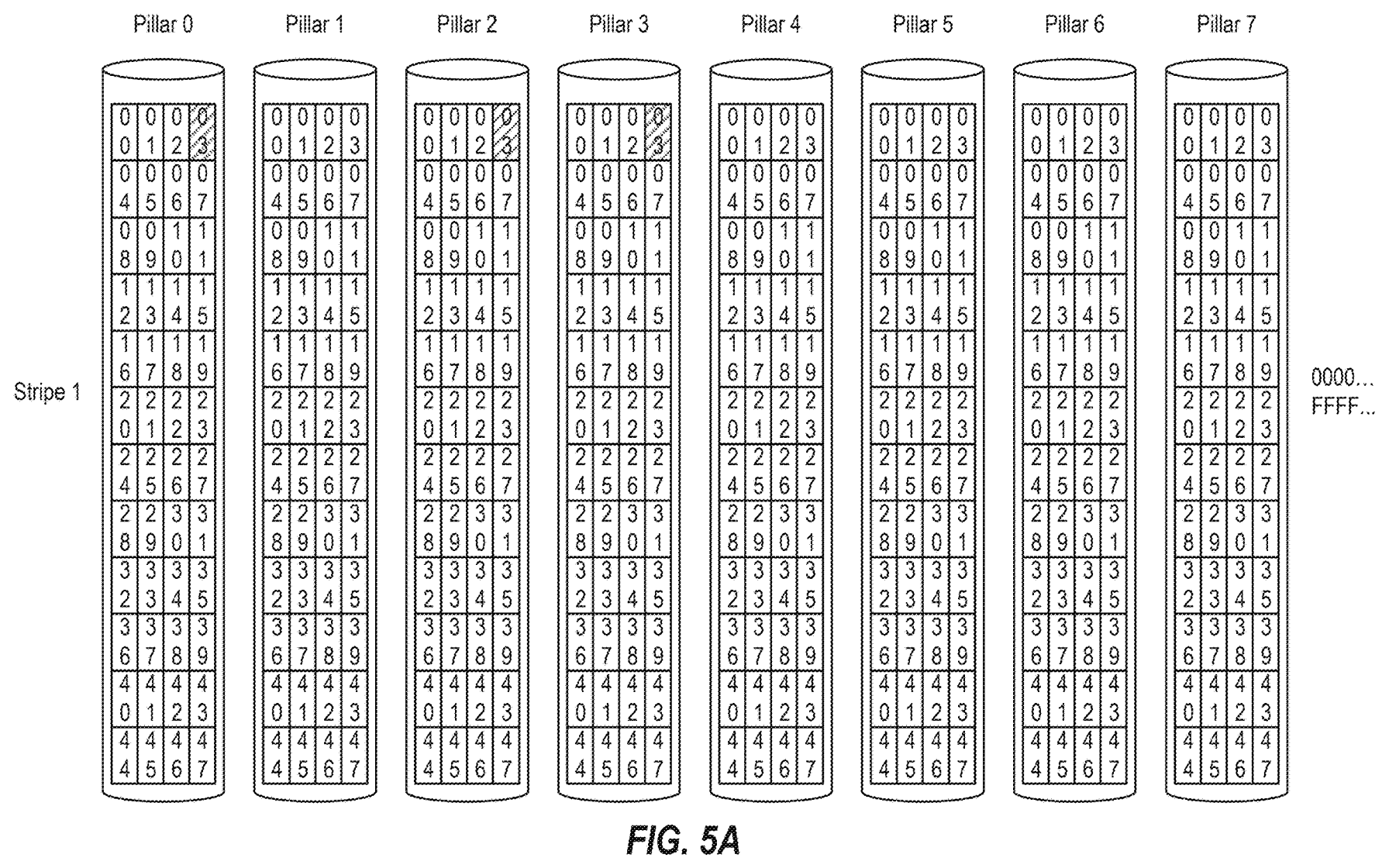
Figure 5B:
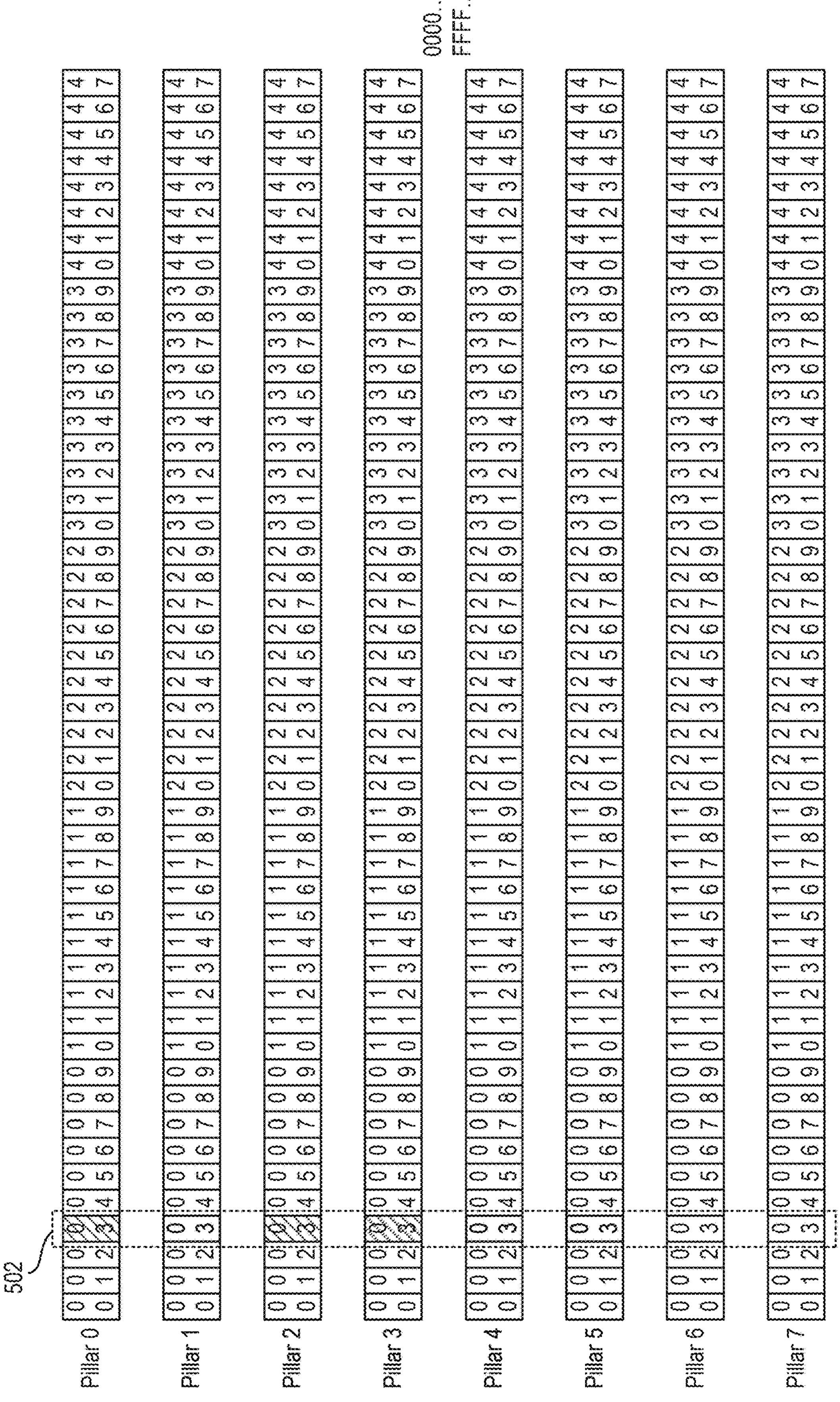

FIG. 4 shows a representation of Stripe 1, which includes multiple components referred to as Pillars, namely Pillar 0, Pillar 1, Pillar 2, Pillar 3, Pillar 4, Pillar 5, Pillar 6, and Pillar 7. These components collectively form a part of the namespace structure within a storage system 200. Stripe 1 serves as a logical grouping of data segments distributed across the various pillars. This organization facilitates efficient data management and retrieval within the storage system. Stripe 1 plays a role in maintaining data integrity and optimizing storage operations. The Pillars serve as storage units that each store a portion of data associated with Stripe 1. As shown in FIGS. 5A and 5B for example, each of the Pillars includes multiple drives (e.g., 48 drives), each numbered 00, 01, 02, 03, . . . 46, 47, 48.

Examples of orchestrating an upgrade of a storage system (e.g., the storage system 200 of FIG. 2) based on namespace range gaps are now described in more detail.

FIGS. 5A and 5B schematically illustrate an example of orchestrating an upgrade of a storage system based on namespace range gaps, according to an embodiment.

In this example, consider a vault with IDA of 8/5/7 (Width/Threshold/Write threshold) with 1 stripe (e.g., width of 8 memory devices across 8 memory devices). In this example, one drive from each memory device goes out of service or become unavailable. In general, this failure should not impact the overall health of the device as well as a set, stripe, storage pool, or vault. But if user upgrades a device that does not have any drive out of service, but if it constitutes a gap in a portion of the namespace range along with three memory devices that have drives out of service then the one or one or more embodiments described herein provide for detecting, warning, and preventing the upgrade of the memory device. In this example, inaccessibility to 3 drives out of 384 drives plus upgrade of a completely healthy device would result in unavailability of a portion of the namespace range for reads or writes. The same applies if, instead of three devices, two devices have drives out of service, then write availability outage occurs (but not read). Each pillar by itself may seem healthy as shown in FIG. 5A.

Even though individually each pillar looks healthy, a portion of namespace range is not healthy if any of the pillars 1, 4, 5, 6, or 7 is taken down for upgrade. Hence an attempt to upgrade any of pillars 1, 4, 5, 6, or 7 is prevented so as to avoid the unavailability of the portion of the namespace range, as can be seen in FIG. 5B. For example, drive 03 in Pillar 0, Pillar 2, Piller 3, and Piller 6 are unavailable as shown in FIG. 5B (the crosshatching represents an unavailable drive or pillar). FIG. 5B shows another representation of the example of FIG. 5A to show the namespace range gap can be triggered by upgrade of any of the Pillars 1, 4, 5, 6, or 7. For example, in the arrangement of FIG. 5B, it is evident that the drives 03 across Pillar 0, Pillar 2, and Piller 3, are unavailable as shown by the box 502.

Figure 6A:
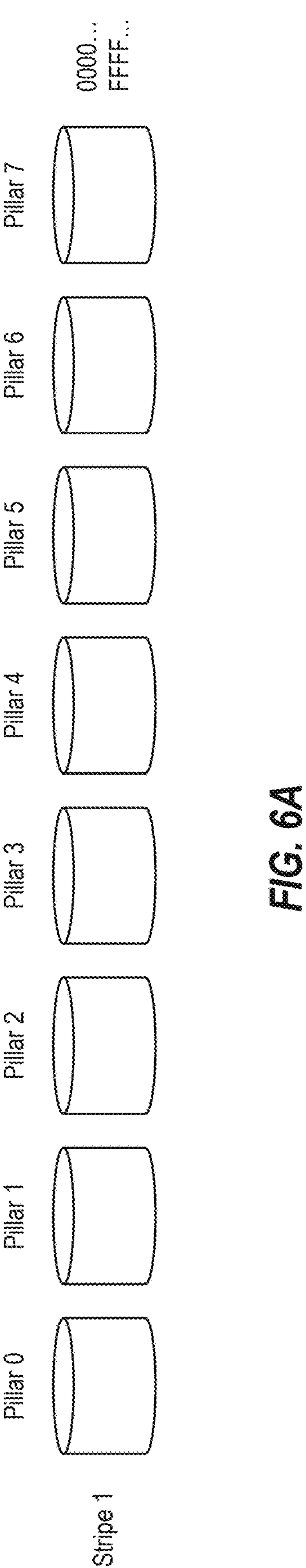
FIGS. 6A and 6B schematically illustrate an example of orchestrating an upgrade of a storage system based on namespace range gaps, according to an embodiment.
Figure 6B:
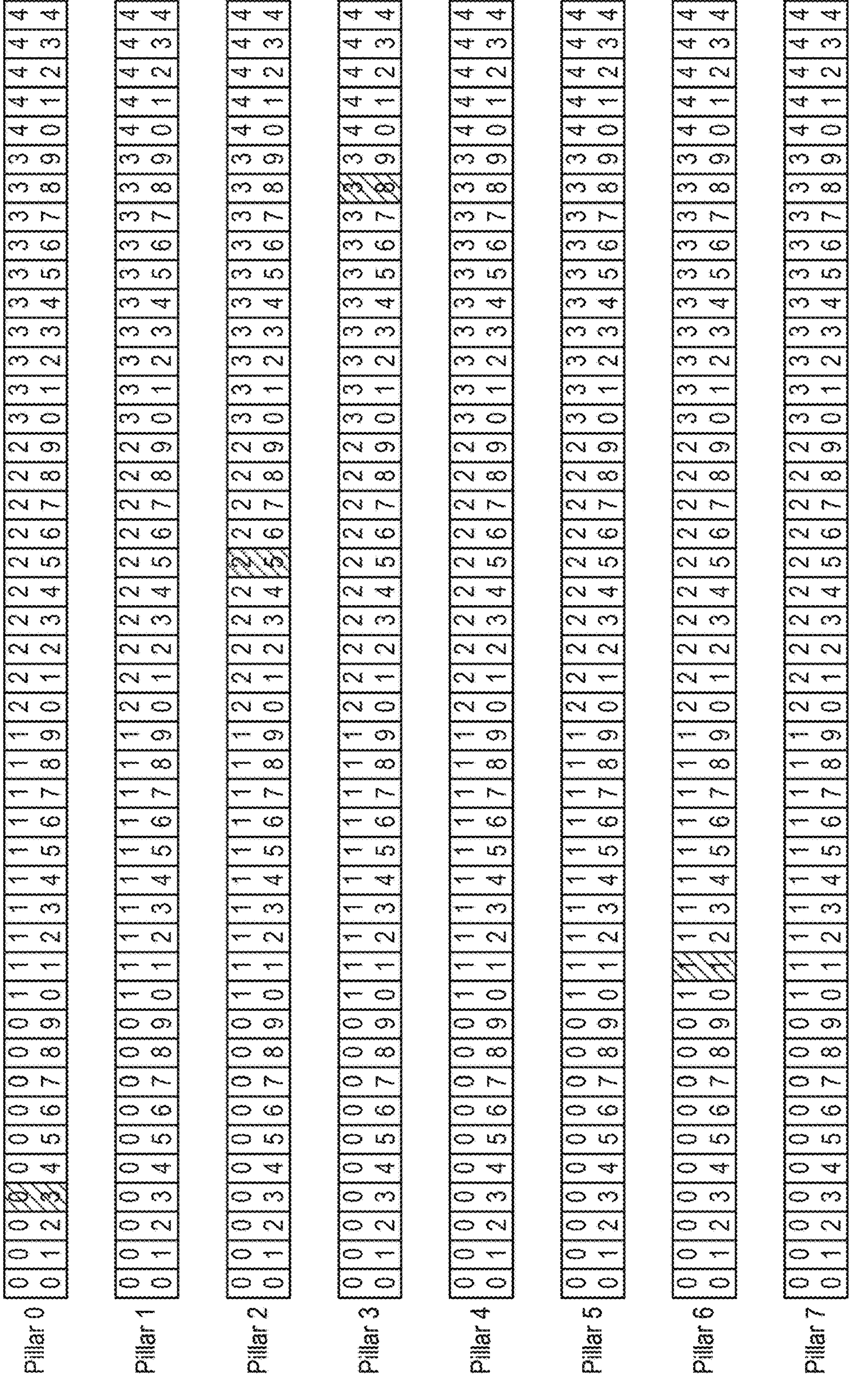

Another example is now described with reference to FIGS. 6A and 6B, which schematically illustrate an example of orchestrating an upgrade of a storage system based on namespace range gaps, according to an embodiment.

In this example, consider the same IDA as the prior example, but in this example, the inaccessibility of 4 drives out of 384 drives does not result in unavailability of any portion of the namespace range for reads or writes while trying to upgrade any of the devices. The memory nodes are reportedly healthy as shown in FIG. 6A. In the example of FIG. 6B, the namespace range is are available for reads and writes, no warning about namespace range gaps is triggered, hence the devices are not prevented to upgrade because the whole namespace range is available for both reads and writes. The upgrade will proceed without causing any availability outage. In this example, drive 03 from Pillar 0, drive 25 from Pillar 2, drive 38 from Pillar 3, and drive 11 Pillar 6 are not unavailable, and any one memory device can be upgraded and during upgrade of the storage system 200 will continue to be available for reads and writes as shown in FIG. 6B.

Figure 7A:
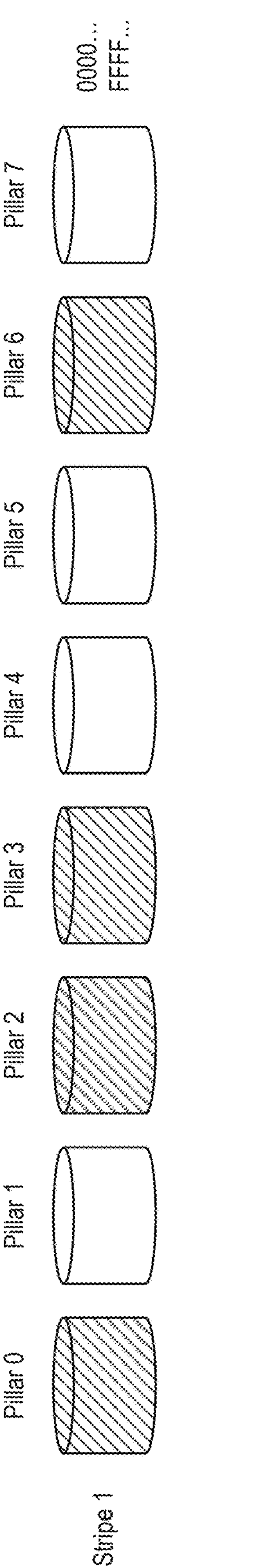
FIGS. 7A and 7B schematically illustrate an example of orchestrating an upgrade of a storage system based on namespace range gaps, according to an embodiment.
Figure 7B:
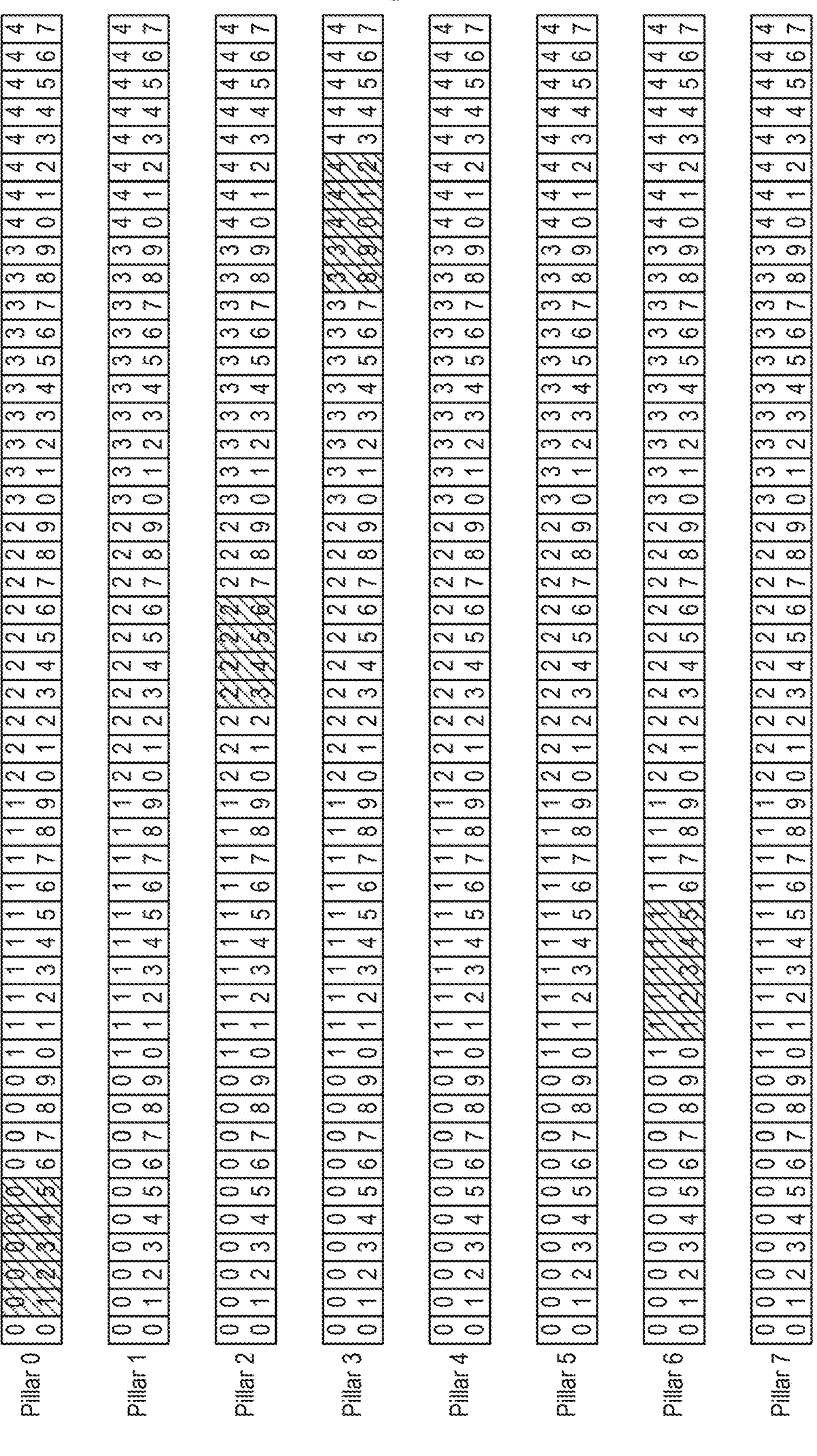

Another example is now described with reference to FIGS. 7A and 7B, which schematically illustrate an example of orchestrating an upgrade of a storage system based on namespace range gaps, according to an embodiment. In this example, inaccessibility to 20 drives out of 384 does not result into unavailability of any portion of the namespace range for reads or writes, as shown in FIG. 7B. In this scenario 4 of the memory devices may seem unhealthy of their own based on thresholds defined to show a device being unhealthy when certain number of drives are not available, as it can be seen in FIG. 7A. For example, a threshold for reads can be set to 4, such that if more than 4 drives are unavailable on a Pillar, the Pillar appears unavailable. Similarly, a threshold for writes can be set to 5, such that if more than 5 drives are unavailable on a Pillar, the Pillar appears unavailable. However, if the unavailable drives do not overlap, or overlap in a limited way, the Pillars are actually not unavailable in terms of the namespace range.

This can be seen in FIG. 7B, which shows that the namespace range is available for reads and writes. Hence, even though the storage system 200 may appear unavailable (FIG. 7A), the reality is the storage system 200 is available for reads and writes and even available for upgrade without any degradation in availability of the storage system 200. In this example drives 01-05 from Pillar 0, drives 23-27 from Pillar 2, drives 38-42 from Pillar 3, and drives 11-15 Pillar 6 are not unavailable. However, because these drives are not aligned across Pillars, as shown in FIG. 7B, the namespace range remains available.

Another example is now described with reference to FIGS. 8A-8C, which schematically illustrate an example of identifying and visualizing namespace range gaps, according to an embodiment. In this example, when the number of memory devices is a multiple of the IDA width, each memory device is responsible for some fraction of a pillar. For example, because there are 3 times as many memory devices as IDA width, each memory device is responsible for one-third of the NSR for each Pillar. As an example, “3 stripes” as horizontal rows are as follows: in a first row (stripe 1), each memory device is responsible for the range 0000 . . . to 5555 . . . of their respective pillars; in a second row (stripe 2), each memory device is responsible for the range 5555 . . . to AAAA . . . of their respective pillars; and in a third row (stripe 3), each memory device is responsible for the range AAAA . . . to FFFF . . . of their respective pillars. In this example, as shown in FIG. 8A, each vertical column represents memory devices responsive for the same pillar.

Figure 8A:
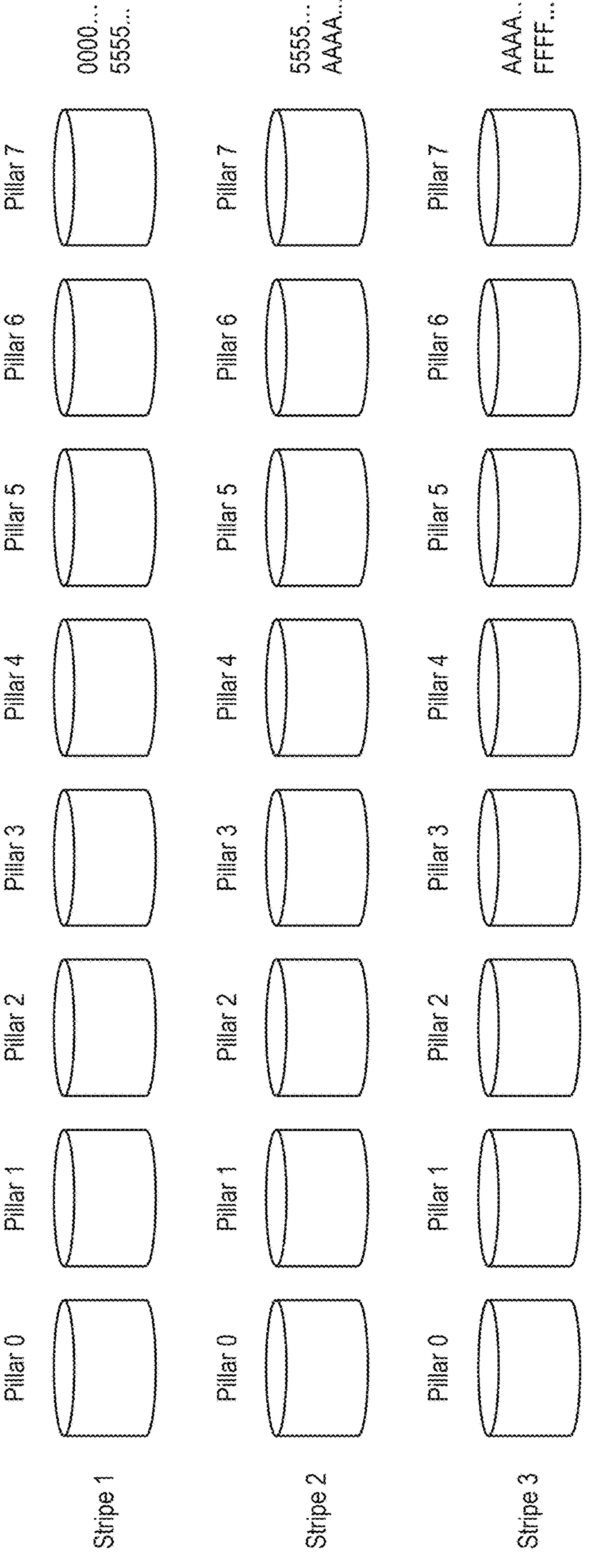
FIGS. 8A, 8B, and 8C schematically illustrate an example of orchestrating an upgrade of a storage system based on namespace range gaps, according to an embodiment.
Figure 8B:
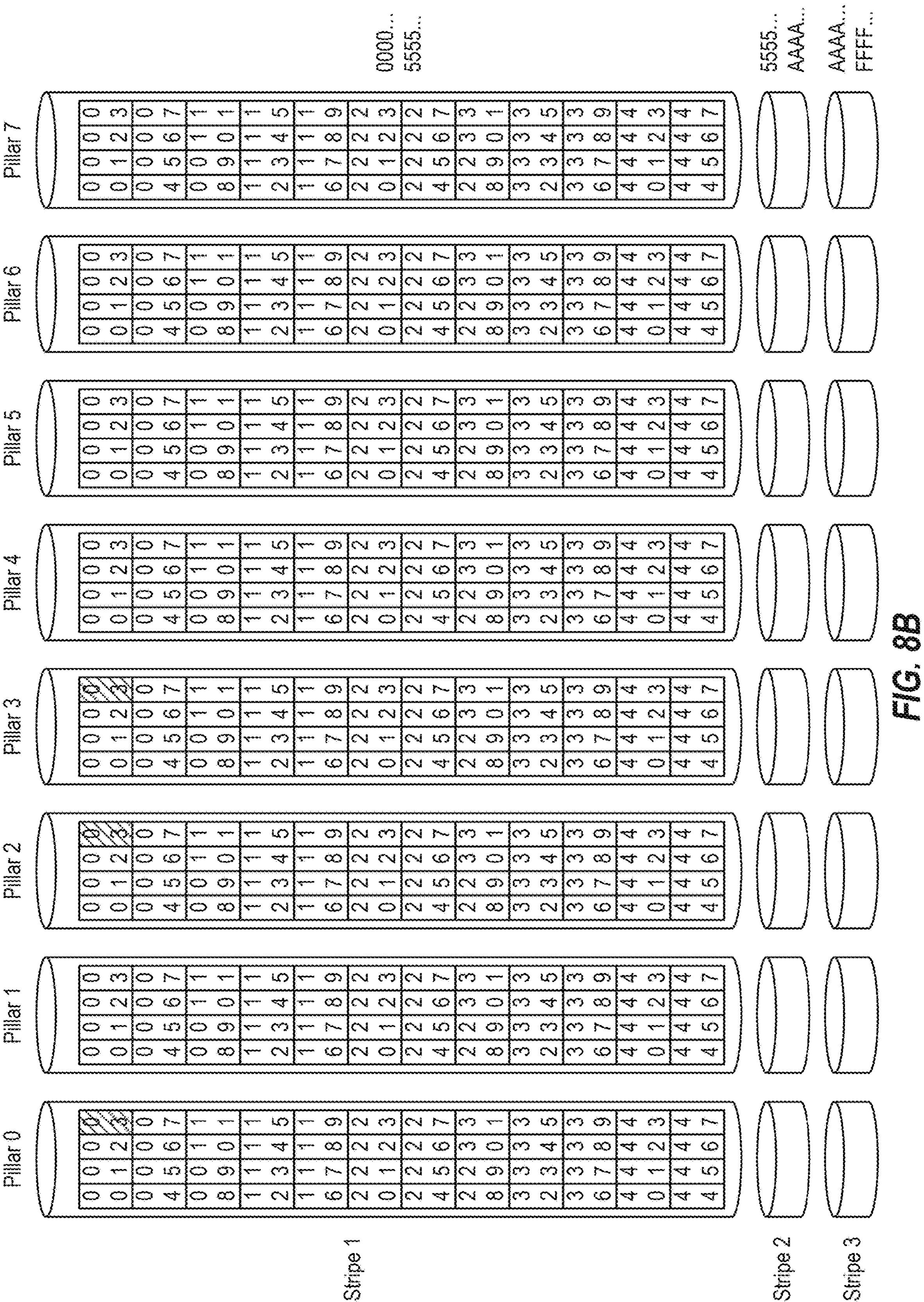
Figure 8C:
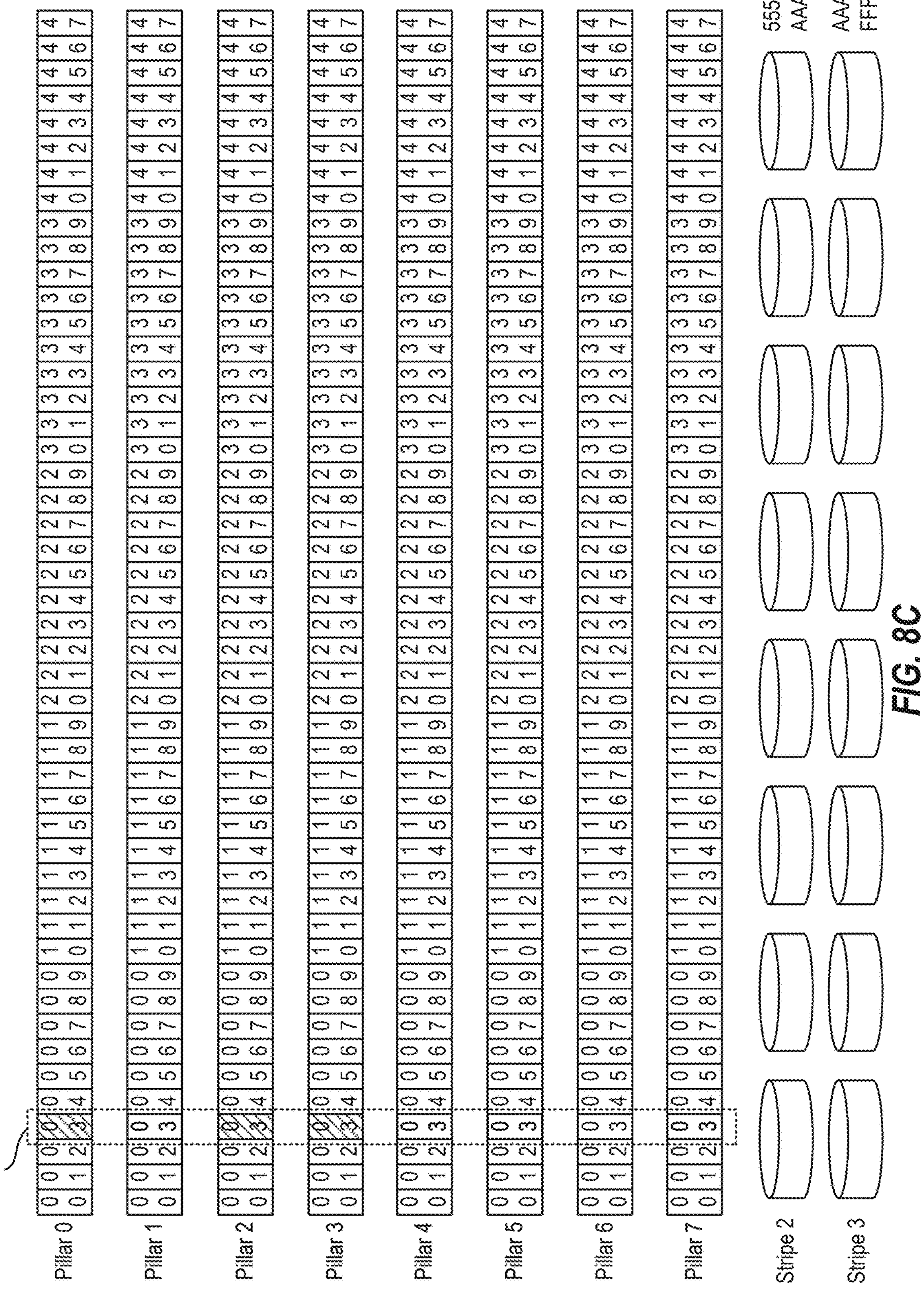

Consider an example of a vault with IDA of 8/5/7 (Width/Threshold/Write threshold) across 24 memory devices (see FIG. 8A). In this case, if the storage system 200 loses one drive from four of the memory devices from Stripe 1 from drive 03. In this example, it can be assumed that stripes 2 and 3 are healthy with no drive issues. In general, losing one drive each from four of the memory devices with 48 drives in each memory device does not impact the overall health of the device as well as a set, stripe, storage pool, or vault. Though, in this example, it constitutes a gap in portion of the namespace range of a vault. In such cases, Stripe 1 may be unavailable for upgrade, while the other stripes (e.g., Stripe 2 and Stripe 3) are able to be upgraded successfully.

Even though individually each pillar looks healthy but a portion of the namespace range in Stripe 1 is not healthy. As a result, one or more embodiments identify the namespace as being (at least partially) unavailability, as it can be seen in FIGS. 8B and 8C. In this example, drive 03 from Pillar 0, Pillar 2, Pillar 3, and Pillar 6 of Stripe 1 are not unavailable, and thus the associated namespace range is unavailable. For example, in FIG. 8C, the gap in the namespace range is evident as shown by box 802.

Figure 9:
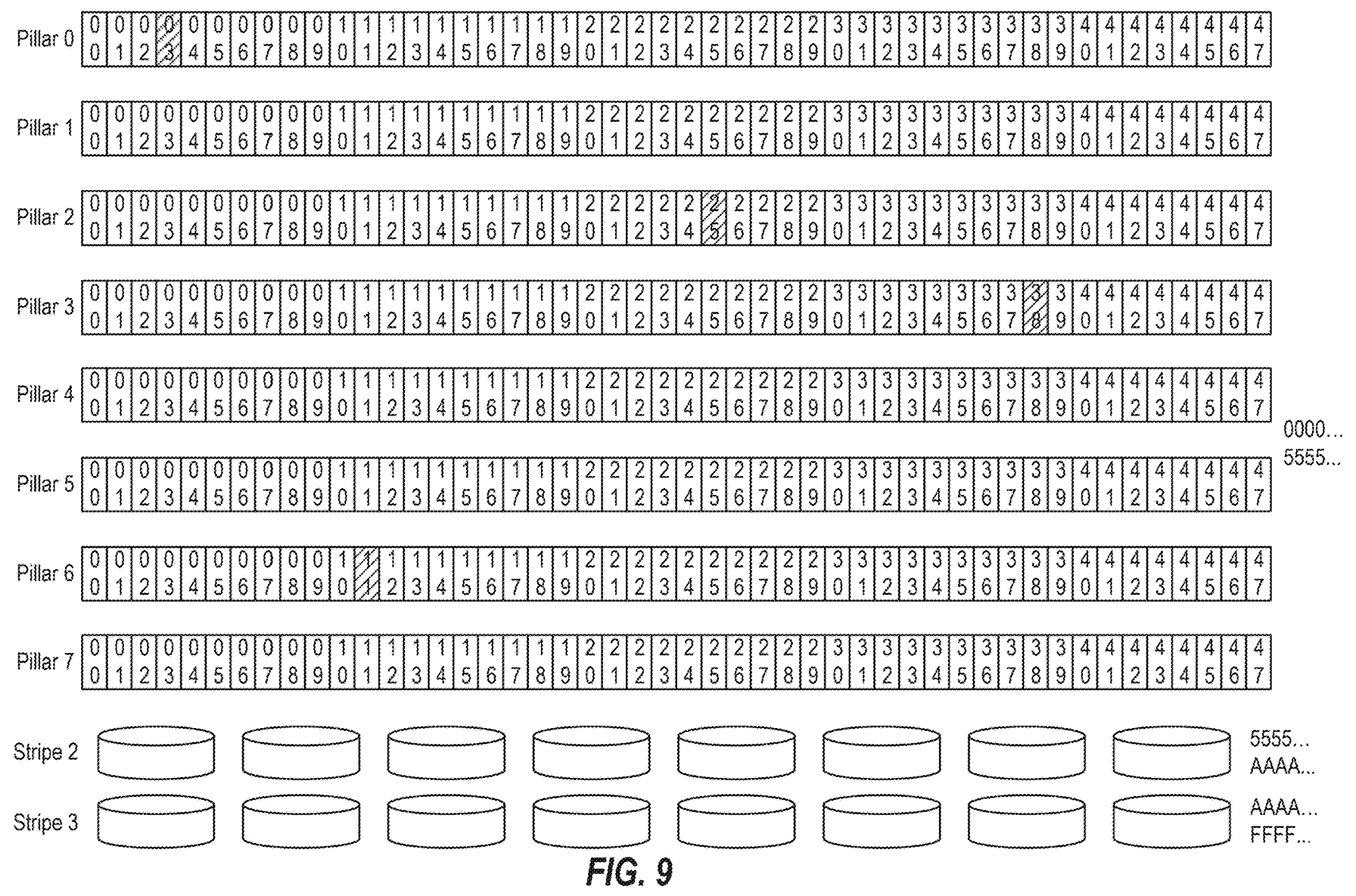

Another example is now described with reference to FIG. 9, which schematically illustrate an example of identifying and visualizing namespace range gaps, according to an embodiment. In this example, the same IDA as the previous example is used, but in this example inaccessibility to 4 drives out of 384 drives in Stripe 1 does not result in unavailability of any portion of the namespace range for reads or writes, and even with upgrading any of the memory devices, the memory devices can be upgrade from each of the stripes without causing any read or write availability outage. For example, the drive 03 in Pillar 0, the drive 25 in Pillar 2, the drive 38 in Pillar 3, and the drive 11 in Piller 6 are unavailable. However, all the memory nodes are reported healthy as shown in FIG. 9 and can be upgraded successfully.

Figure 10A:
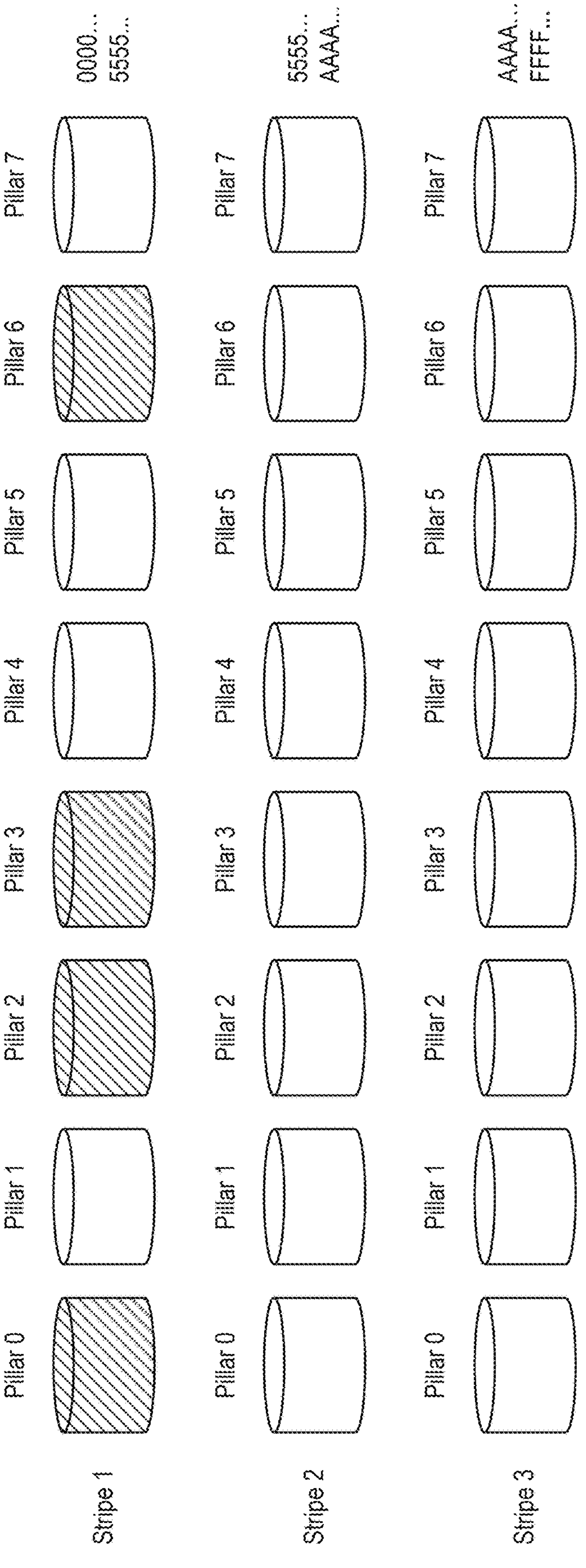
FIGS. 10A and 10B schematically illustrate an example of orchestrating an upgrade of a storage system based on namespace range gaps, according to an embodiment.

Another example is now described with reference to FIGS. 10A and 10B, which schematically illustrate an example of identifying and visualizing namespace range gaps, according to an embodiment. In this example, inaccessibility to 20 drives out of 384 drives in Stripe 1 does not result into unavailability of any portion of the namespace range for reads or writes, as it can be seen in FIG. 10B. In this example, 4 of the memory devices may seem unhealthy (e.g., Pillars 0, 2, 3 and 6 of Stripe 1 as shown in FIG. 10A)

individually based on thresholds defines to show a device being unhealthy when a certain number of drives are not available.

Figure 10B:
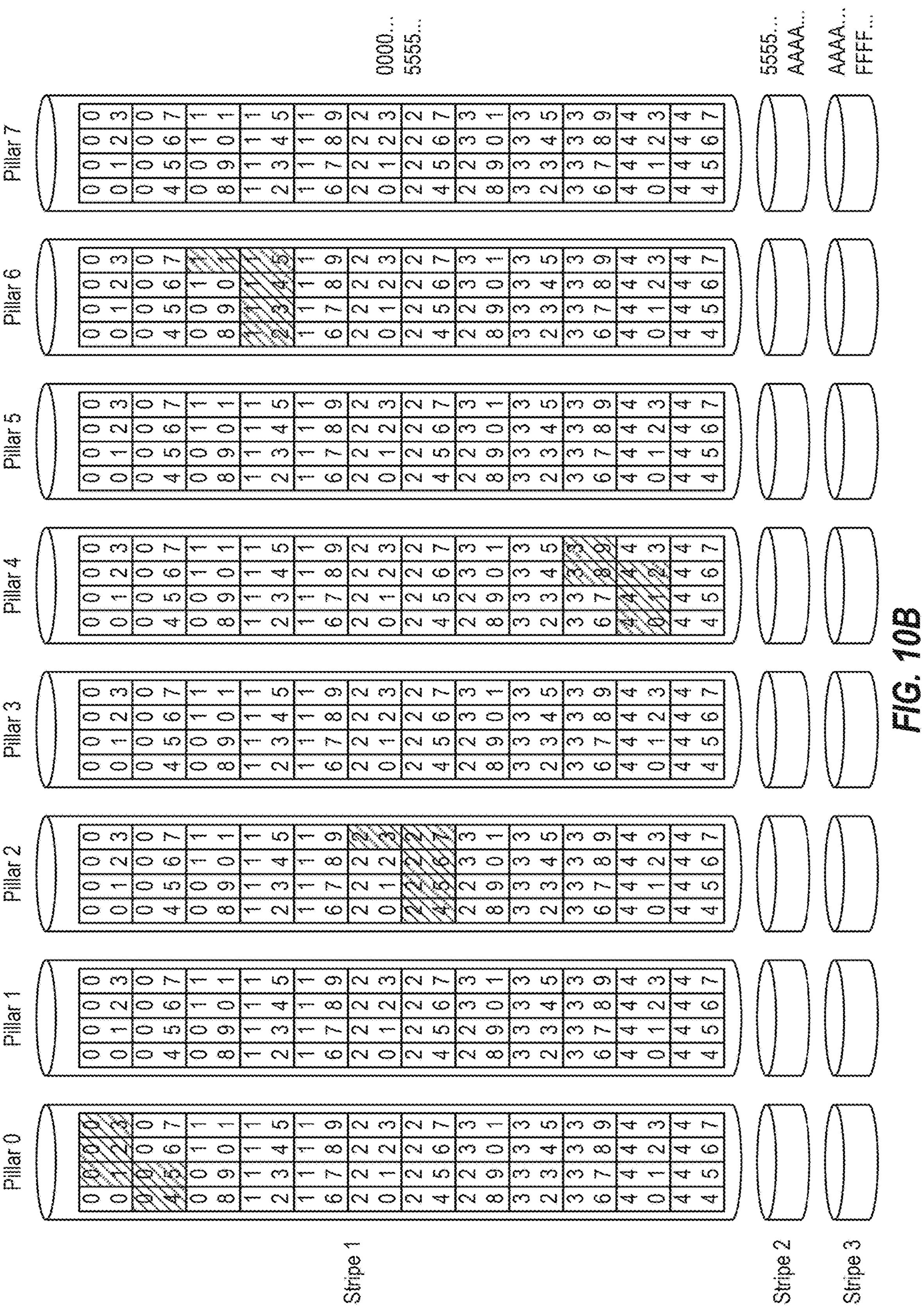

In FIG. 10B, it is shown that the namespace range is available for reads and writes, because the unavailable drives do not constitute unavailability of any portion of the namespace range. In this example drives 01-05 from Pillar 0, drives 23-27 from Pillar 2, drives 38-42 from Pillar 3, and drives 11-15 Pillar 6 from Stripe 1 are unavailable; however, because the drives do not align relative to one another across pillars, the namespace range remains available. Therefore, upgrades of any of the memory devices from each of Stripe 1 through Stripe 3 can proceed because the available namespace range health information.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:

identifying an upgrade to be made to a storage system, wherein the upgrade involves replacing a failed or failing drive of the storage system;

receiving, at a management device from a plurality of storage devices of the storage system, namespace information for each of the plurality of storage devices, the namespace information being shared among the plurality of storage devices;

determining, by the management device, whether a namespace gap exists based at least in part on the namespace information for each of the plurality of storage devices;

determining, by the management device, whether a namespace gap conflict exists with respect to the upgrade, wherein a namespace gap conflict is determined to exist when it is determined that the namespace gap interferes with replacing the failed or failing drive of the storage system; and responsive to determining that the namespace gap conflicts with the upgrade, implementing the upgrade while reducing the namespace gap conflict.

2. The computer-implemented method of claim 1, further comprising storing, by the management device, the namespace information for each of the plurality of storage devices.

3. The computer-implemented method of claim 2, wherein the namespace information is stored in a database communicatively coupled to the management device.

4. The computer-implemented method of claim 1, wherein determining whether the namespace gap exists comprises looping over each stripe of the plurality of storage devices to identify a gap that results in a vault operating in one of read only, alert, or write only mode.

5. The computer-implemented method of claim 1, wherein the namespace gap is determined to exist responsive to determining that a threshold number of memory devices of one of the plurality of storage devices are unavailable.

6. The computer-implemented method of claim 5, wherein the threshold number of memory devices is a read threshold.

7. The computer-implemented method of claim 5, wherein the threshold number of memory devices is a write threshold.

8. The computer-implemented method of claim 1, further comprising:

determining whether implementing the upgrade results in unavailability of the storage system; and responsive to determining that implementing the upgrade results in unavailability of the storage system, preventing additional upgrades to the storage system.

9. A computer system comprising:

a processor set;

one or more computer-readable storage media; and program instructions stored on the one or more computer-readable storage media to cause the processor set to perform operations comprising:

identifying an upgrade to be made to a storage system, wherein the upgrade involves replacing a failed or failing drive of the storage system;

receiving, at a management device from a plurality of storage devices of the storage system, namespace information for each of the plurality of storage devices, the namespace information being shared among the plurality of storage devices;

determining, by the management device, whether a namespace gap exists based at least in part on the namespace information for each of the plurality of storage devices;

determining, by the management device, whether a namespace gap conflict exists with respect to the upgrade, wherein a namespace gap conflict is determined to exist when it is determined that the namespace gap interferes with replacing the failed or failing drive of the storage system; and responsive to determining that the namespace gap conflicts with the upgrade, implementing the upgrade while reducing the namespace gap conflict.

10. The computer system of claim 9, wherein the operations further comprise storing, by the management device, the namespace information for each of the plurality of storage devices.

11. The computer system of claim 10, wherein the namespace information is stored in a database communicatively coupled to the management device.

12. The computer system of claim 9, wherein determining whether the namespace gap exists comprises looping over each stripe of the plurality of storage devices to identify a gap that results in a vault operating in one of read only, alert, or write only mode.

13. The computer system of claim 9, wherein the namespace gap is determined to exist responsive to determining that a threshold number of memory devices of one of the plurality of storage devices are unavailable.

14. The computer system of claim 13, wherein the threshold number of memory devices is a read threshold.

15. The computer system of claim 13, wherein the threshold number of memory devices is a write threshold.

16. The computer system of claim 9, wherein the operations further comprise:

determining whether implementing the upgrade results in unavailability of the storage system; and responsive to determining that implementing the upgrade results in unavailability of the storage system, preventing additional upgrades to the storage system.

17. A computer program product comprising:

one or more computer-readable storage media; and program instructions stored on the one or more computer-readable storage media to perform operations comprising:

identifying an upgrade to be made to a storage system, wherein the upgrade involves replacing a failed or failing drive of the storage system;

receiving, at a management device from a plurality of storage devices of the storage system, namespace information for each of the plurality of storage devices, the namespace information being shared among the plurality of storage devices;

determining, by the management device, whether a namespace gap exists based at least in part on the namespace information for each of the plurality of storage devices;

determining, by the management device, whether a namespace gap conflict exists with respect to the upgrade, wherein a namespace gap conflict is determined to exist when it is determined that the namespace gap interferes with replacing the failed or failing drive of the storage system; and responsive to determining that the namespace gap conflicts with the upgrade, implementing the upgrade while reducing the namespace gap conflict.

18. The computer program product of claim 17, wherein the operations further comprise storing, by the management device, the namespace information for each of the plurality of storage devices.

19. The computer program product of claim 18, wherein the namespace information is stored in a database communicatively coupled to the management device.

20. The computer program product of claim 17, wherein determining whether the namespace gap exists comprises looping over each stripe of the plurality of storage devices to identify a gap that results in a vault operating in one of read only, alert, or write only mode.

* * * * *